United States Patent
Mashimo (10) Patent No.: US 6,954,709 B2
(45) Date of Patent: Oct. 11, 2005

(54) SIGNAL PROCESSING CIRCUIT OUTPUTTING A SIGNAL REPRESENTING THE NUMBER OF TIMES AN INPUT SIGNAL RISES IN A PREDETERMINED PERIOD AS A SIGNAL CORRESPONDING TO A QUALITY OF THE INPUT SIGNAL

(75) Inventor: Akira Mashimo, Tokorozawa (JP)

(73) Assignee: TEAC Corporation (JP)

( * ) Notice: Subject to any disclaimer, the term of this patent is extended or adjusted under 35 U.S.C. 154(b) by 193 days.

(21) Appl. No.: 10/226,448

(22) Filed: Aug. 23, 2002

(65) Prior Publication Data

US 2003/0046037 A1 Mar. 6, 2003

(30) Foreign Application Priority Data

Sep. 6, 2001 (JP) ........................................ 2001-270995

(51) Int. Cl.[7] .............................................. G06F 19/00
(52) U.S. Cl. ...................................... 702/81; 324/76.11
(58) Field of Search ........................... 702/81, 182–185, 702/69, 188–191; 324/500, 76.11

(56) References Cited

U.S. PATENT DOCUMENTS

| 5,095,264 A | * | 3/1992 | Hulsing, II | ............... 324/76.47 |
| 5,099,153 A | * | 3/1992 | Adams | ........................ 327/292 |
| 6,556,640 B1 | * | 4/2003 | Baba | ........................... 375/376 |

FOREIGN PATENT DOCUMENTS

| JP | 2000-222829 | 8/2000 |
| JP | 2001-237681 | 8/2001 |

* cited by examiner

*Primary Examiner*—Marc S. Hoff
*Assistant Examiner*—Edward Raymond
(74) *Attorney, Agent, or Firm*—Anderson Kill & Olick, PC (57) ABSTRACT

A signal processing circuit outputs a signal corresponding to a quality of a digitized input signal. An edge counter of the signal processing circuit counts the number of times the input signal rises and/or falls in a predetermined period. An output unit of the signal processing circuit outputs a signal representing the number of times counted by the edge counter. This signal is output as the signal corresponding to the quality of the input signal.

12 Claims, 6 Drawing Sheets

SIGNAL PROCESSING CIRCUIT OUTPUTTING A SIGNAL REPRESENTING THE NUMBER OF TIMES AN INPUT SIGNAL RISES IN A PREDETERMINED PERIOD AS A SIGNAL CORRESPONDING TO A QUALITY OF THE INPUT SIGNAL

BACKGROUND OF THE INVENTION

1. Field of the Invention

The present invention generally relates to a signal processing circuit, and more particularly, to a signal processing circuit outputting a signal corresponding to a quality of a digitized input signal, such as a wobble signal.

2. Description of the Related Art

Conventionally, a wobble is formed on a recording optical disk, such as a CD or a DVD, in which a track on/from which information is recorded/reproduced wobbles in radial directions. An optical disk device comprises an optical head that opposes the surface of the disk upon the disk being mounted on the optical disk device. The optical head projects a laser light on the disk so as to record information on the disk, and also receives a reflected light from the disk so as to output a reproduction signal corresponding to information recorded on the disk. Information reproduced by the optical head includes a signal originating from the wobble formed on the disk (hereinafter referred to as a wobble signal). The optical disk device extracts the wobble signal from the information reproduced by the optical head, and according to this wobble signal, performs an obtainment of address information representing a disk position, a drive control of a spindle motor revolving the disk, or a generation of a reference clock, etc.

Thus, in order to cause the optical disk device to function properly, a wobble signal that accords properly to the wobble formed on the optical disk needs to be generated from the wobble. That is, if a wobble signal is not properly and surely reproduced according to the wobble of the disk, it may happen that a recording to the disk is interrupted, and further that the recording becomes unable to resume. Accordingly, to avoid these inconveniences, it is important to monitor a quality of the wobble signal generated from the wobble of the optical disk.

The quality of the wobble signal is found aggravated when a detection error of the address information, etc. included in the wobble signal occurs. Accordingly, it is possible to judge the quality of the wobble signal according to the presence of the detection error of the address information.

However, the detection error of the address information based on the wobble signal does not occur until the quality of the wobble signal becomes aggravated considerably. Accordingly, when the detection error of the address information is detected, it may already happen that a recording to the disk is interrupted, and further that the recording becomes unable to resume, due to the aggravation of the quality of the wobble signal. Therefore, in consideration of this point, it is not appropriate to judge the quality of the wobble signal according to whether or not the detection error of the address information occurs.

SUMMARY OF THE INVENTION

It is a general object of the present invention to provide an improved and useful signal processing circuit in which the above-mentioned problems are eliminated.

A more specific object of the present invention is to provide a signal processing circuit enabling a judgment of a quality of a digitized input signal before a detection error of information included in the input signal occurs.

In order to achieve the above-mentioned objects, there is provided according to one aspect of the present invention a signal processing circuit outputting a signal corresponding to a quality of a digitized input signal, the circuit comprising an edge counter counting a number of times the input signal rises and/or falls in a predetermined period, and an output unit outputting a signal corresponding to the number of times as the signal corresponding to the quality of the input signal.

According to the present invention, the signal corresponding to the number of times the digitized input signal rises and/or falls in the predetermined period is output as the signal corresponding to the quality of the input signal. The number of times the input signal rises and/or falls in the predetermined period is one, when the quality thereof is not deteriorated; and the number of times becomes a plurality of times exceeding one, as the quality thereof becomes more aggravated. Thus, in the present invention, the signal corresponding to the quality of the input signal is output. By the way, a detection error of information included in the input signal does not occur until the quality of the input signal becomes considerably aggravated. Thereupon, outputting the signal corresponding to the quality of the input signal enables a judgment of the quality of the input signal before the above-mentioned detection error occurs.

Additionally, in the signal processing circuit according to the present invention, the predetermined period may be predetermined by cycles of the input signal.

Additionally, the signal processing circuit according to the present invention may further comprise a noise-removed signal generation unit generating a noise-removed signal from the input signal, the noise-removed signal excluding a noise component, wherein the predetermined period is between two times at which a polarity of the noise-removed signal is inverted.

According to the present invention, a count value of the edge counter can be made to be the number of times the input signal rises and/or falls between two times at which the polarity of the noise-removed signal excluding a noise component of the input signal is inverted.

Additionally, in the signal processing circuit according to the present invention, the noise-removed signal generation unit may comprise a cumulative time counting unit counting a cumulative time in which the input signal is at one of a high-level state and a low-level state, and a retention unit performing one of a setting and a resetting of a high-level state according to the cumulative time, and clearing the cumulative time according to the state, wherein the edge counter may count the number of times the input signal rises and/or falls in a period after the retention unit performs one of the setting and the resetting of the high-level state until next time the retention unit performs one of the setting and the resetting of the high-level state.

Additionally, in the signal processing circuit according to the present invention, the cumulative time counting unit may comprise a gate unit outputting a predetermined clock according to the input signal, and a counting unit counting the predetermined clock, wherein the retention unit may perform one of the setting and the resetting of the high-level state according to a count value of the counting unit, and clear the count value of the counting unit according to the state.

Additionally, in the signal processing circuit according to the present invention, the gate unit may comprise a first gate unit outputting the predetermined clock during a period in which the input signal is at the high-level state, and a second gate unit outputting the predetermined clock during a period in which the input signal is at the low-level state, and the counting unit may comprise a first counting unit counting the predetermined clock output from the first gate unit, and a second counting unit counting the predetermined clock output from the second gate unit, wherein the retention unit may perform the setting of the high-level state and clear a count value of the second counting unit when a count value of the first counting unit reaches a first count value, and perform the resetting of the high-level state and clear the count value of the first counting unit when the count value of the second counting unit reaches a second count value Additionally, the signal processing circuit according to the present invention may further comprise a latch circuit latching a count value of the edge counter when the count value of the counting unit reaches a predetermined value, and a delay circuit delaying an output of the counting unit by a predetermined time, wherein the edge counter may be cleared according to an output of the delay circuit.

Besides, according to the signal output by the output unit which signal corresponds to the quality of the input signal, the quality of the input signal can be judged.

Accordingly, the signal processing circuit according to the present invention may further comprise a quality judgment unit judging the quality of the input signal according to the signal output by the output unit.

According to the present invention, the quality of the digitized input signal can be judged before a detection error of information included in the input signal occurs.

Additionally, in the signal processing circuit according to the present invention, the quality judgment unit may judge that the quality of the input signal is aggravated when the number of times represented by the signal output by the output unit exceeds a predetermined number of times.

Additionally, in the signal processing circuit according to the present invention, the quality judgment unit may judge that the quality of the input signal is more aggravated as the number of times represented by the signal output by the output unit becomes larger.

Additionally, the signal processing circuit according to the present invention may further comprise a warning unit performing a predetermined warning to the effect that an abnormality occurs in the input signal when the number of times represented by the signal output by the output unit exceeds a predetermined number of times.

According to the present invention, when the number of times the input signal rises and/or falls in the predetermined period exceeds the predetermined number of times, the predetermined warning is performed. Thus, a user can be informed that an abnormality occurs in the quality of the input signal.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figure 1:
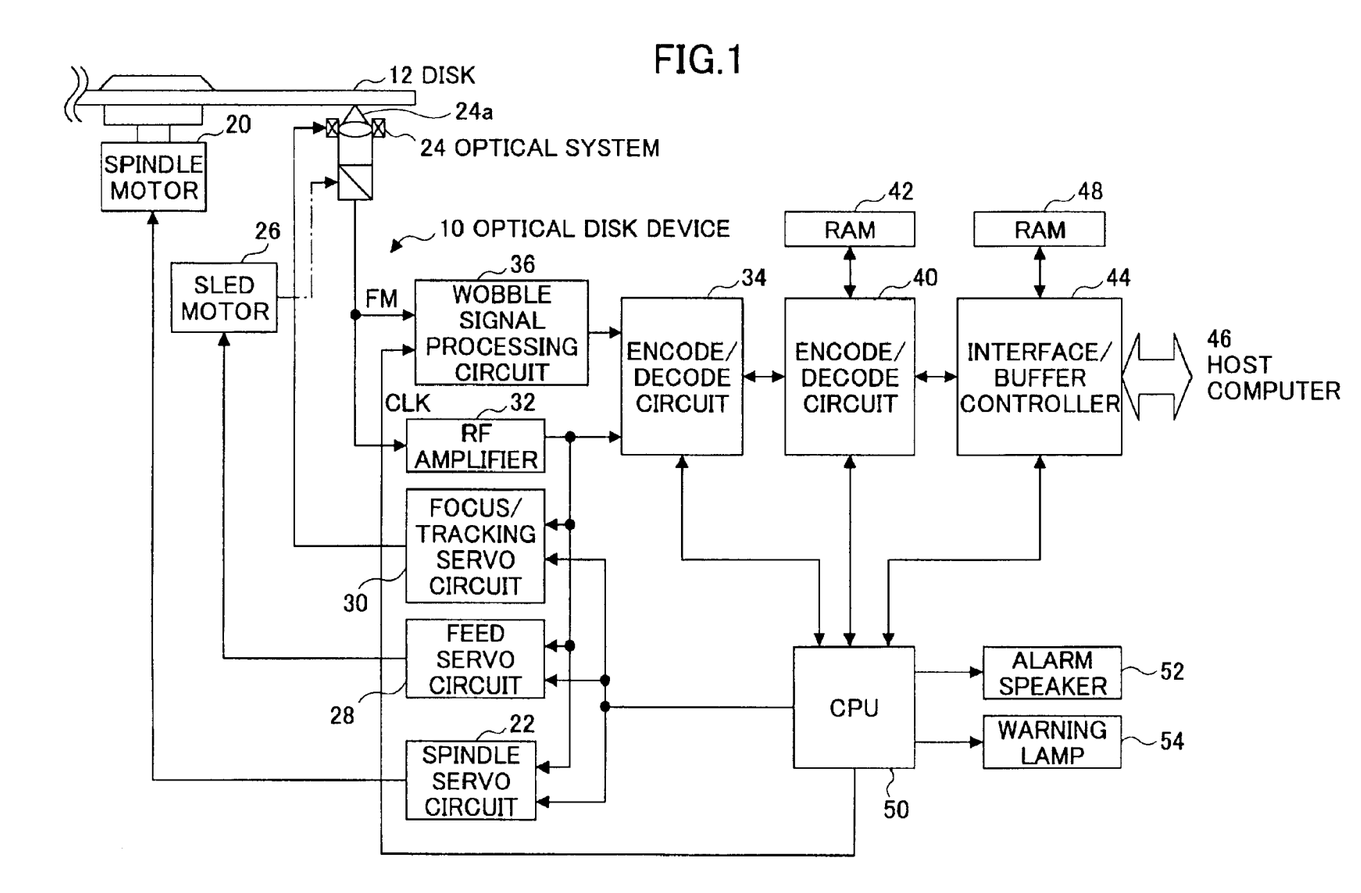
FIG. 1 is a block diagram of an optical disk device including a signal processing circuit according to an embodiment of the present invention.
Figure 2:
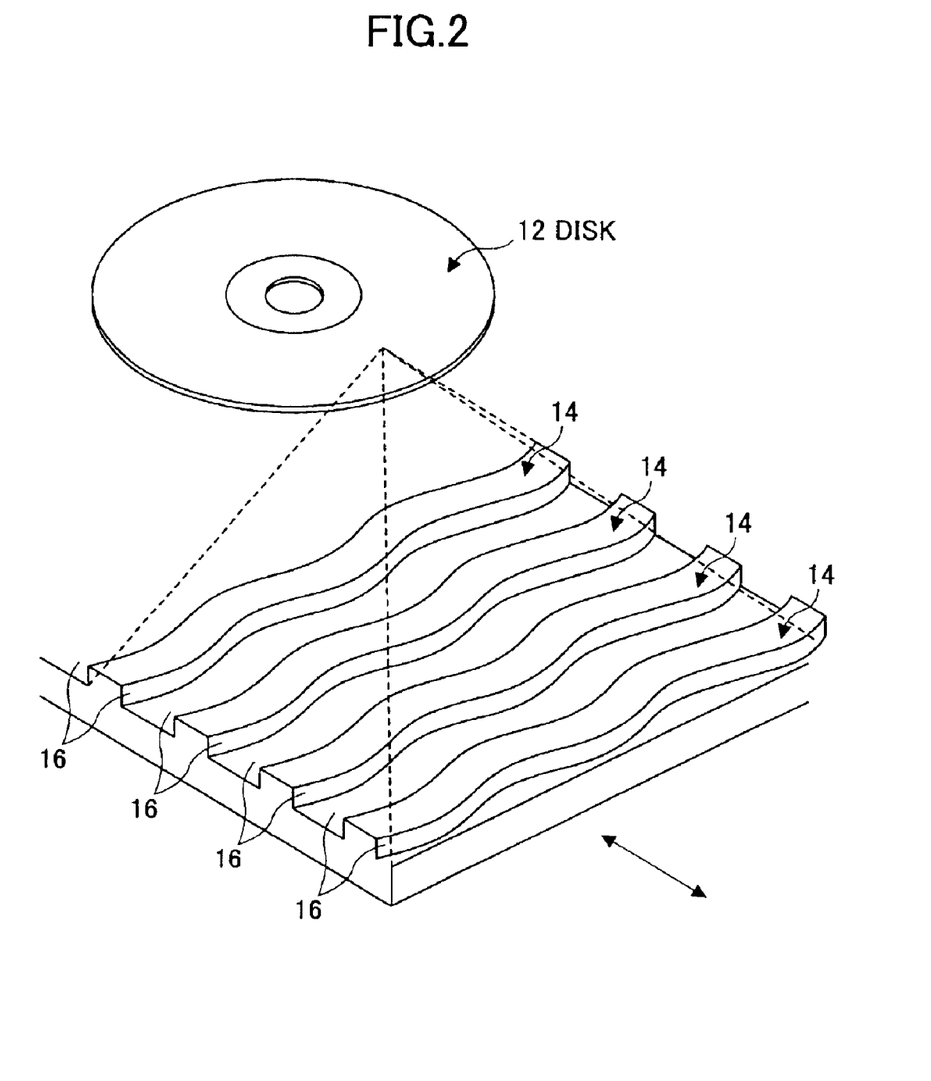
FIG. 2 is an illustration of a structure of an optical disk mounted on the optical disk device according to the present embodiment.

FIG. 1 is a block diagram of an optical disk device 10 according to an embodiment of the present invention. FIG. 2 is an illustration of a structure of an optical disk mounted on the optical disk device 10 according to the present embodiment.

In the present embodiment, the optical disk device 10 is a DVD-R/RW drive, for example, (a block diagram of a recording system is omitted). A DVD-R/RW disk (hereinafter simply referred to as a disk) 12 is mounted on the optical disk device 10 so that the optical disk device 10 records/reproduces information with respect to the disk 12. As shown in FIG. 2, the disk 12 mounted on the optical disk device 10 has a groove 14 as a track on/from which information is recorded/reproduced. The groove 14 wobbles in radial directions of the disk 12 at a predetermined cycle. That is, a wobble 16 in the form of sine waves is formed on the disk 12.

As shown in FIG. 1, the optical disk device 10 comprises a spindle motor 20. The spindle motor 20 has a function of revolving the disk 12 mounted on the optical disk device 10. The spindle motor 20 is connected with a spindle servo circuit 22. The spindle servo circuit 22 performs a drive direction over the spindle motor 20 so that the disk 12 revolves at a predetermined revolving speed.

The optical disk device 10 also comprises an optical system 24. The optical system 24 includes an optical head 24a positioned so as to oppose the surface of the disk 12 mounted on the optical disk device 10. The optical head 24a projects a laser light on the disk 12 so as to record information on the disk 12, and also receives a reflected light from the disk 12 so as to output a reproduction signal corresponding to information recorded on the disk 12.

The optical disk device 10 also comprises a sled motor 26. The sled motor 26 has a function of moving a carriage composing the optical system 24 in the radial directions of the disk 12. The sled motor 26 is connected with a feed servo circuit 28. The feed servo circuit 28 performs a drive direction over the sled motor 26 so that the carriage of the optical system 24 is positioned at a predetermined diametrical position.

The optical system 24 includes a focus/tracking actuator (not shown in the figure) performing a focus/tracking control of the optical system 24. The focus/tracking actuator is connected with a focus/tracking servo circuit 30. The focus/tracking servo circuit 30 performs a drive direction over the actuator so that the optical system 24 is focused/tracked according to a predetermined rule. The sled motor 26 and the focus/tracking actuator are thus driven so that the location of the laser beam projected on the disk 12 by the optical system 24 is controlled.

The optical system 24 is connected with an RF amplifier 32. The reproduction signal output by the optical head 24a, the reproduction signal corresponding to information recorded on the disk 12, is supplied to the RF amplifier 32. The RF amplifier 32 amplifies the reproduction signal. The RF amplifier 32 is connected with an encode/decode circuit 34. A primary signal of the reproduction signal amplified by the RF amplifier 32 is supplied to the encode/decode circuit 34. The encode/decode circuit 34 extracts various servo signals from the signal supplied from the RF amplifier 32, and outputs the signals to each of the servo circuits.

The optical system 24 is also connected with a wobble signal processing circuit 36. The reproduction signal output by the optical head 24a includes a signal in the form of sine waves originating from the wobble 16 formed on the disk 12 (hereinafter referred to as a wobble signal). The wobble signal processing circuit 36 extracts the wobble signal in the form of sine waves from the reproduction signal output by the optical head 24a, and processes the signal as described in detail hereinafter. The wobble signal processing circuit 36 is also connected with the above-mentioned encode/decode circuit 34. The encode/decode circuit 34 demodulates the signal supplied from the wobble signal processing circuit 36, and extracts address information representing a track position on the disk 12 from the signal.

The encode/decode circuit 34 is connected with an encode/decode circuit 40. The encode/decode circuit 40 performs processes, such as encoding/decoding ECC (Error Correcting Code) specific to the disk 12 mounted on the optical disk device 10, and detecting a header. The encode/decode circuit 40 comprises a RAM 42. The RAM 42 is used as a working storage for the processes in the encode/decode circuit 40.

The encode/decode circuit 40 is connected with an interface/buffer controller 44. The interface/buffer controller 44 connects to a host computer 46. The interface/buffer controller 44 exchanges data with the host computer 46, and controls a data buffer. The interface/buffer controller 44 comprises a RAM 48. The RAM 48 is used as a working storage for the interface/buffer controller 44.

The encode/decode circuits 34 and 40 and the interface/buffer controller 44 are connected with a CPU 50. The CPU 50 controls the optical disk device 10 as a whole according to directions from the host computer 46, specifically, such as the controls by the spindle servo circuit 22, the feed servo circuit 28 and the focus/tracking servo circuit 30, as well as the control of the laser in the optical system 24. The CPU 50 is connected with an alarm speaker 52 and a warning lamp 54. The CPU 50 drives the alarm speaker 52 and the warning lamp 54 when an abnormality occurs with respect to the control of the optical disk device 10. According to directions from the CPU 50, the alarm speaker 52 and the warning lamp 54 perform alarming/warning with respect to the abnormality of the optical disk device 10. Besides, the alarm speaker 52 and the warning lamp 54 form a warning unit.

Figure 3:
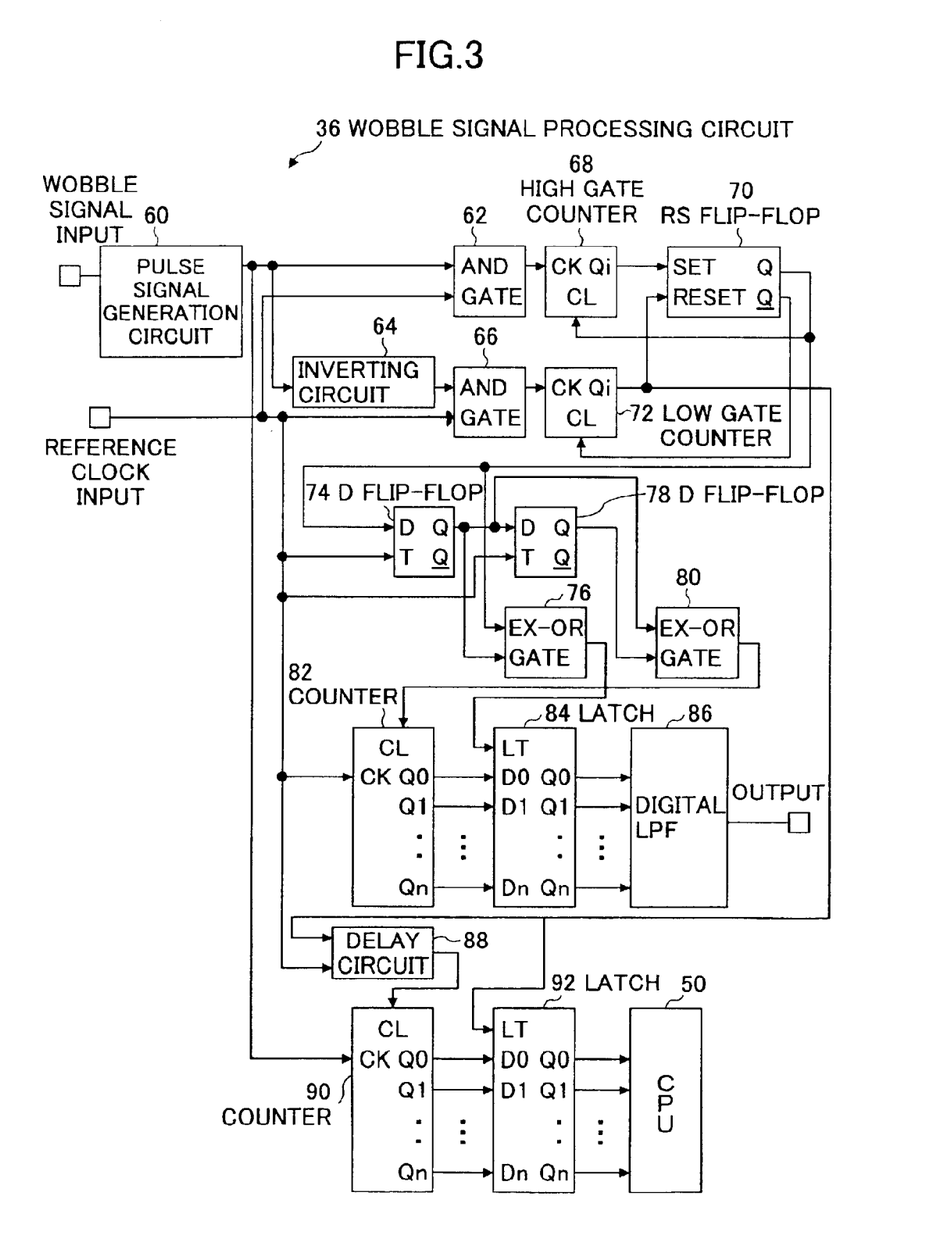
FIG. 3 is a block diagram in the signal processing circuit of the optical disk device according to the present embodiment.

FIG. 3 is a block diagram in the wobble signal processing circuit 36 of the optical disk device 10. The wobble signal processing circuit 36 comprises a pulse signal generation circuit 60. The frequency-modulated (FM) wobble signal is supplied from the optical head 24a of the optical system 24 to the pulse signal generation circuit 60. First, the pulse signal generation circuit 60 compares the frequency-modulated signal supplied as the wobble signal with a zero level. Then, when the level of the frequency-modulated signal is equal to or larger than "0", the pulse signal generation circuit 60 outputs a high-level signal; on the other hand, when the level of the frequency-modulated signal is smaller than "0", the pulse signal generation circuit 60 outputs a low-level signal. Thereby, the pulse signal generation circuit 60 converts the wobble signal into digital data so as to generate an FM pulse signal.

An output terminal of the pulse signal generation circuit 60 is connected to an AND gate 62, and is also connected to an AND gate 66 via an inverting circuit 64. A reference clock at a predetermined time interval is supplied from the CPU 50 to both the AND gates 62 and 66. When a wobble signal resulting from being converted into the FM pulse signal by the pulse signal generation circuit 60 is at the high level, the AND gate 62 passes the reference clock supplied from the CPU 50. An output terminal of the AND gate 62 is connected with a clock input terminal of a high gate counter 68. The reference clock passed through the AND gate 62 is supplied to the high gate counter 68. The high gate counter 68 has a function of counting the supplied reference clock. An output terminal of the high gate counter 68 is connected to a set terminal of an RS flip-flop 70 (a retention unit). The high gate counter 68 supplies the set terminal of the RS flip-flop 70 with a value $Q_i$ at an i-th digit (i-th representing an ordinal number) of a count value obtained by counting the reference clock.

The inverting circuit 64 inverts the wobble signal converted into the FM pulse signal by the pulse signal generation circuit 60, and supplies the inverted signal to the AND gate 66. When the signal supplied from the inverting circuit 64 is at the high level, in other words, when the wobble signal converted into the FM pulse signal by the pulse signal generation circuit 60 is at the low level, the AND gate 66 passes the reference clock supplied from the CPU 50. An output terminal of the AND gate 66 is connected with a clock input terminal of a low gate counter 72. The reference clock passed through the AND gate 66 is supplied to the low gate counter 72. The low gate counter 72 has a function of counting the supplied reference clock. An output terminal of the low gate counter 72 is connected to a reset terminal of the RS flip-flop 70. The low gate counter 72 supplies the reset terminal of the RS flip-flop 70 with a value $Q_i$ at an i-th digit of a count value obtained by counting the reference clock. Besides, at least the AND gate 62, the AND gate 66, the high gate counter 68 and the low gate counter 72 form a cumulative time counting unit.

Accordingly, when the value $Q_1$ at the i-th digit of the high gate counter 68 rises, the RS flip-flop 70 sets a noninverted output Q (to high level), and resets an inverted output inverter-Q (to low level). When the value $Q_i$ at the i-th digit of the low gate counter 72 rises, the RS flip-flop 70 resets the noninverted output Q, and sets the inverted output inverter-Q.

A noninverted output terminal Q of the RS flip-flop 70 is connected to a clear terminal of the high gate counter 68. The high gate counter 68 is cleared when the noninverted output Q of the RS flip-flop 70 is at the high level. An inverted output terminal inverter-Q of the RS flip-flop 70 is connected to a clear terminal of the low gate counter 72. The low gate counter 72 is cleared when the inverted output inverter-Q of the RS flip-flop 70 is at the high level. Besides, at least the pulse signal generation circuit 60, the AND gate 62, the AND gate 66, the high gate counter 68, the low gate counter 72 and the RS flip-flop 70 form a noise-removed signal generation unit generating noise-removed signals from the wobble signal, the noise-removed signals excluding noise components.

The noninverted output terminal Q of the RS flip-flop 70 is also connected to a data terminal of a D flip-flop 74, and is connected to an EX-OR gate 76. The above-mentioned reference clock from the CPU 50 is supplied to a clock terminal of the D flip-flop 74. The D flip-flop 74 retains a level detected at the data terminal upon the reference clock rising, and outputs the level. An output terminal Q of the D flip-flop 74 is connected to a data terminal of a D flip-flop 78, is connected to the above-mentioned EX-OR gate 76, and is also connected to an EX-OR gate 80. The EX-OR gate 76 outputs an exclusive OR of the noninverted output Q of the RS flip-flop 70 and the output of the D flip-flop 74.

The above-mentioned reference clock from the CPU 50 is supplied to a clock terminal of the D flip-flop 78. The D flip-flop 78 retains a level detected at the data terminal upon the reference clock rising, and outputs the level. An output terminal Q of the D flip-flop 78 is connected to the above-mentioned EX-OR gate 80. The EX-OR gate 80 outputs an exclusive OR of the output of the D flip-flop 74 and the output of the D flip-flop 78.

An output terminal of the EX-OR gate 80 is connected to a clear terminal of a counter 82. The reference clock from the CPU 50 is supplied to the counter 82. The counter 82 counts the reference clock, and when the output of the EX-OR gate 80 is at high level, the counter 82 clears a count value. Output terminals of the counter 82 are connected to a latch 84. An output terminal of the above-mentioned EX-OR gate 76 is connected to a latch terminal of the latch 84. The latch 84 latches the count value supplied from the counter 82 when the output of the EX-OR gate 76 rises.

Output terminals of the latch 84 are connected with a digital LPF (Low Pass Filter) 86. The digital LPF 86 performs a low-pass process with respect to the count value, which is a digital value, supplied from the latch 84 so as to remove noises. Accordingly, the wobble signal processing circuit 36 converts the wobble signal originating from the wobble 16 formed on the disk 12 according to the address information, from the frequency-modulated signal in the form of sine waves, into a digital signal, and outputs the digital signal to the encode/decode circuit 34.

The output terminal of the low gate counter 72 is connected to an input terminal of a delay circuit 88. The reference clock from the CPU 50 is supplied to the delay circuit 88. When the output of the low gate counter 72 becomes high-level, the delay circuit 88 keeps an output thereof low-level until a next clock is supplied; when the next clock is supplied, the delay circuit 88 makes the output high-level; and when a clock after the next clock is supplied, the delay circuit 88 makes the output low-level. An output terminal of the delay circuit 88 is connected to a clear terminal of a counter 90. The counter 90 is connected with the pulse signal generation circuit 60, and is supplied with the wobble signal digitally converted into the FM pulse signal. The counter 90 counts the number of times edges of the wobble signal rise from the low level to the high level, and when the output of the delay circuit 88 is at the high level, the counter 90 clears a count value thereof.

Output terminals of the counter 90 are connected to input terminals of a latch 92. The above-mentioned output terminal of the low gate counter 72 is also connected to a latch terminal of the latch 92. The latch 92 latches the count value supplied from the counter 90 when the output of the low gate counter 72 rises. Output terminals of the latch 92 are connected with the CPU 50. The CPU 50 detects the number of the times the edges of the wobble signal converted into the FM pulse signal rise from the low level to the high level according to the count value latched by the latch 92. Besides, at least the latch 92 forms an output unit outputting a signal corresponding to the count value supplied from the counter 90 as a signal corresponding to a quality of the wobble signal.

Next, a description will be given, with reference to FIG. 4, of an operation of the wobble signal processing circuit 36 shown in FIG. 3.

Figure 4:
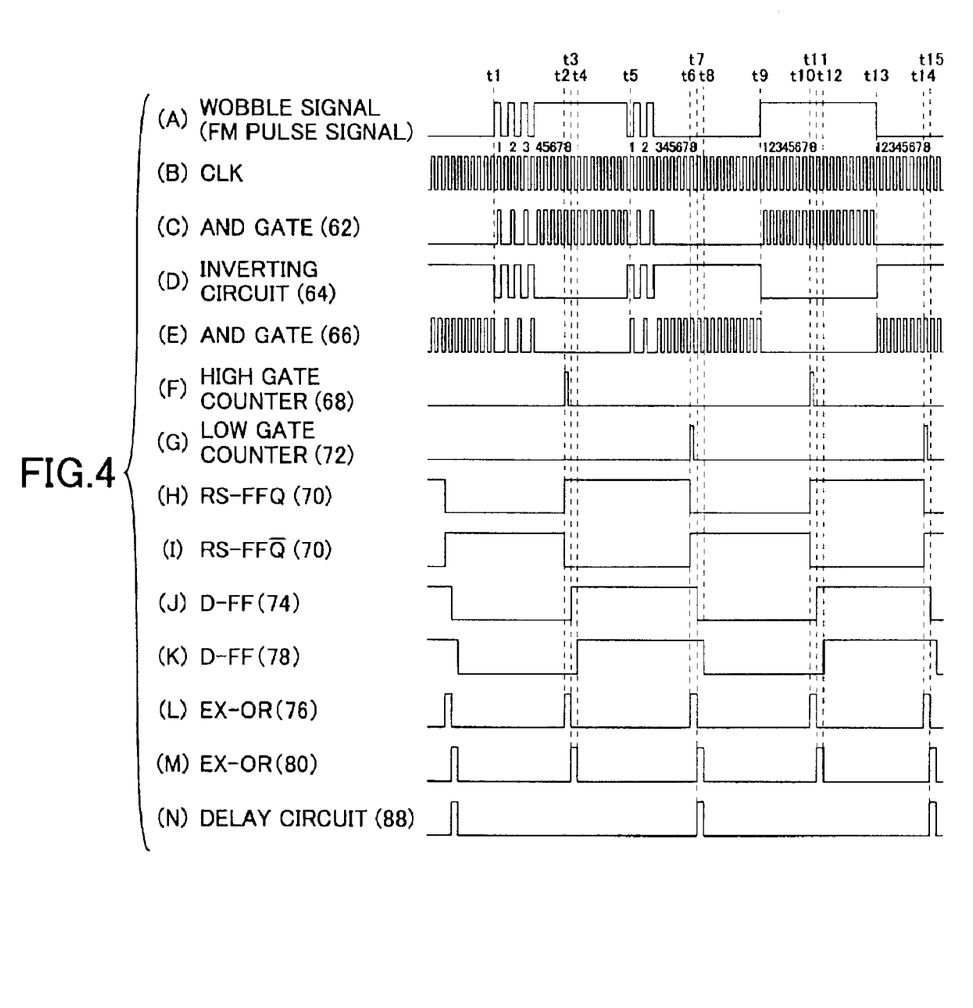
FIG. 4 is a diagram showing operational waveforms of the signal processing circuit according to the present embodiment.

FIG. 4 is a diagram showing operational waveforms of the wobble signal processing circuit according to the present embodiment. FIG. 4-(A) shows an output waveform of the pulse signal generation circuit 60. FIG. 4-(B) shows the reference clock. FIG. 4-(C) shows an output waveform of the AND gate 62. FIG. 4-(D) shows an output waveform of the inverting circuit 64. FIG. 4-(E) shows an output waveform of the AND gate 66. FIG. 4-(F) shows an output waveform of the high gate counter 68. FIG. 4-(G) shows an output waveform of the low gate counter 72. FIG. 4-(H) shows a noninverted output waveform of the RS flip-flop 70. FIG. 4-(I) shows an inverted output waveform of the RS flip-flop 70. FIG. 4-(J) shows an output waveform of the D flip-flop 74. FIG. 4-(K) shows an output waveform of the D flip-flop 78. FIG. 4-(L) shows an output waveform of the EX-OR gate 76. FIG. 4-(M) shows an output waveform of the EX-OR gate 80. FIG. 4-(N) shows an output waveform of the delay circuit 88.

Under a condition where the wobble signal in the form of pulses generated by the pulse signal generation circuit 60 is kept at low level (prior to time t1 (or time t9)), the noninverted output Q of the RS flip-flop 70 is kept at low level, and the inverted output inverter-Q thereof is kept at high level. Therefore, the low gate counter 72 is in a cleared state, as shown in FIG. 4-(G). When the wobble signal in the form of pulses changes to high level at time t1 as shown in FIG. 4-(A), the AND gate 62 passes the reference clock only during the period in which the wobble signal is at high level, as shown in FIG. 4-(C), so that the high gate counter 68 starts counting the clock from the above-mentioned state. Besides, when the wobble signal in the form of pulses changes from high level to low level, the AND gate 62 does not pass the reference clock, whereby the high gate counter 68 interrupts the counting of the clock.

Assuming that the high gate counter 68 supplies the set terminal of the RS flip-flop 70 with a value $Q_3$ at a 3rd digit, for example, the high gate counter 68 supplies the set terminal of the RS flip-flop 70 with a low-level signal until the high gate counter 68 counts the clock to eight. Then, upon counting the clock to eight at time t2 (or time t10), the high gate counter 68 supplies the set terminal of the RS flip-flop 70 with a high-level signal, as shown in FIG. 4-(F). When the set terminal is supplied with the high-level signal, the noninverted output Q of the RS flip-flop 70 is inverted to high level, as shown in FIG. 4-(H), and the inverted output inverter-Q thereof is inverted to low level, as shown in FIG. 4-(I). When the noninverted output Q of the RS flip-flop 70 becomes high level, the high gate counter 68 is brought into a cleared state. When the inverted output inverter-Q of the RS flip-flop 70 becomes low level, the cleared state of the low gate counter 72 is cancelled.

Additionally, when the noninverted output Q of the RS flip-flop 70 is inverted to high level, the output of the D flip-flop 74 maintains low level until a next clock is supplied. When this condition is fulfilled, the two inputs of the EX-OR gate 76 are high-level and low-level so that the output of the EX-OR gate 76 is inverted from low level to high level, as shown in FIG. 4-(L). When the output of the EX-OR gate 76 is inverted to high level, the latch 84 latches the output of the counter 82 upon an up edge of the output of the EX-OR gate 76.

Thereafter, when the next clock is supplied at time t3 (or time t11), the output of the D flip-flop 74 is inverted to high level, as shown in FIG. 4-(J), so that both the two inputs of the EX-OR gate 76 become high-level. In this case, the output of the EX-OR gate 76 is inverted from high level to low level. Additionally, when the output of the D flip-flop 74 is inverted to high level, the output of the D flip-flop 78 maintains low level until a next clock is supplied. When this condition is fulfilled, the two inputs of the EX-OR gate 80 are high-level and low-level so that the output of the EX-OR gate 80 is inverted from low level to high level, as shown in FIG. 4-(M). When the output of the EX-OR gate 80 is inverted to high level, the count value of the counter 82 is cleared. Thus, the count value of the counter 82 is cleared immediately after being latched by the latch 84.

Thereafter, when the next clock is supplied at time t4 (or time t12), the output of the D flip-flop 78 is inverted to high level, as shown in FIG. 4-(K), so that both the two inputs of the EX-OR gate 80 become high-level. In this case, the output of the EX-OR gate 80 is inverted from high level to low level. When the output of the EX-OR gate 80 becomes low level, the cleared state of the counter 82 is cancelled.

Subsequently, when the wobble signal in the form of pulses changes from high level to low level at time t5 (or time t13), the AND gate 66 passes the reference clock only during the period in which the wobble signal is at low level, as shown in FIG. 4-(E), so that the low gate counter 72 counts the clock. Besides, when the wobble signal in the form of pulses changes from low level to high level, the AND gate 66 does not pass the reference clock, whereby the low gate counter 72 interrupts the counting of the clock.

Assuming that the low gate counter 72 supplies the reset terminal of the RS flip-flop 70 with a value $Q_3$ at a 3rd digit, for example, the output of the low gate counter 72 is kept at low level until the low gate counter 72 counts the clock to eight. Then, when the clock is counted to eight at time t6 (or time t14), the output of the low gate counter 72 is inverted to high level, as shown in FIG. 4-(G). In this case, the reset terminal of the RS flip-flop 70, the latch terminal of the latch 92, and the delay circuit 88 are supplied with a high-level signal.

When the reset terminal of the RS flip-flop 70 is supplied with the high-level signal, the noninverted output Q of the RS flip-flop 70 is inverted to low level so as to be reset, and the inverted output inverter-Q thereof is inverted to high level When the noninverted output Q of the RS flip-flop 70 is reset, the cleared state of the high gate counter 68 is cancelled. When the inverted output inverter-Q of the RS flip-flop 70 becomes high level, the low gate counter 72 is brought into a cleared state. When the latch terminal of the latch 92 is supplied with the high-level signal, the latch 92 latches the output of the counter 90 upon an up edge of the high-level signal.

Additionally, when the noninverted output Q of the RS flip-flop 70 is inverted to low level, the output of the D flip-flop 74 maintains high level until a next clock is supplied. Thereby, the two inputs of the EX-OR gate 76 become low-level and high-level so that the output of the EX-OR gate 76 is inverted from low level to high level. In this case, the latch 84 latches the count value of the counter 82 at that point, upon an up edge of the output of the EX-OR gate 76.

Thereafter, when the next clock is supplied at time t7 (or time t15), the output of the D flip-flop 74 is inverted to low level so that both the two inputs of the EX-OR gate 76 become low-level. Thereby, the output of the EX-OR gate 76 is inverted from high level to low level. Additionally, when the output of the D flip-flop 74 is inverted to low level, the output of the D flip-flop 78 maintains high level until a next clock is supplied. Thereby, the two inputs of the EX-OR gate 80 become low-level and high-level so that the output of the EX-OR gate 80 is inverted from low level to high level. In this case, the count value of the counter 82 is cleared.

In addition, when the clock is supplied at time t7 (or time t15), the output of the delay circuit 88 is inverted from low level to high level. In this case, the count value of the counter 90 is cleared. Thus, the count value of the counter 90 is cleared immediately after being latched by the latch 92.

Thereafter, when the clock is supplied at time t8, the output of the D flip-flop 78 is inverted to low level so that both the two inputs of the EX-OR gate 80 become low-level. Thereby, the output of the EX-OR gate 80 is inverted from high level to low level. In this case, the cleared state of the counter 82 is cancelled. In addition, when the clock is supplied at time t8, the output of the delay circuit 88 is inverted from high level to low level. In this case, the cleared state of the counter 90 is cancelled.

In the above-described configuration, the high gate counter 68 counts the number of times the reference clock rises or falls only when the wobble signal resulting from being converted digitally into the pulse signal is at high level, as a result of which, when the number of the times reaches a predetermined value, it is judged that the wobble signal becomes high-level. Additionally, the low gate counter 72 counts the number of times the reference clock rises or falls only when the wobble signal is at low level, as a result of which, when the number of the times reaches a predetermined value, it is judged that the wobble signal becomes low-level. In other words, the number of the times used for judging whether or not the wobble signal becomes high-level is not counted when the wobble signal is at low level, and the number of the times used for judging whether or not the wobble signal becomes low-level is not counted when the wobble signal is at high level.

Thus, according to the present embodiment, even when the wobble signal converted digitally into the pulse signal by the pulse signal generation circuit 60 contains noises so that counting of the number of times the reference clock rises or falls is started by a first noise thereof, the counting can be prevented from being performed continuously thereafter. Therefore, it is possible to detect both a high-level period and a low-level period of the digitized wobble signal while alleviating influences of noises.

Additionally, in the above-described configuration, in a period after the cleared state of the counter 90 is cancelled until the counter 90 is latched, specifically, in a period after the wobble signal is judged to change from high level to low level until next time the wobble signal is judged to change from high level to low level, the number of times the wobble signal digitized by the pulse signal generation circuit 60 changes from low level to high level, i.e., the number of times edges of the wobble signal rise, is counted.

When the wobble signal is digitized properly according to the wobble 16 of the disk 12, noises are not superimposed on the wobble signal; therefore, the wobble signal rises once in one cycle. However, when the digitized wobble signal is influenced by noises, the wobble signal rises more than once, i.e., a plurality of times, in one cycle. As noises superimposed on the wobble signal become excessive, the number of times the wobble signal rises becomes larger, which means that the quality of the wobble signal converted digitally into the pulse signal by the pulse signal generation circuit 60 is aggravated. Accordingly, counting the number of times edges of the wobble signal converted into the pulse signal by the pulse signal generation circuit 60 rise in one cycle enables a judgment of the quality of the wobble signal.

Figure 5:
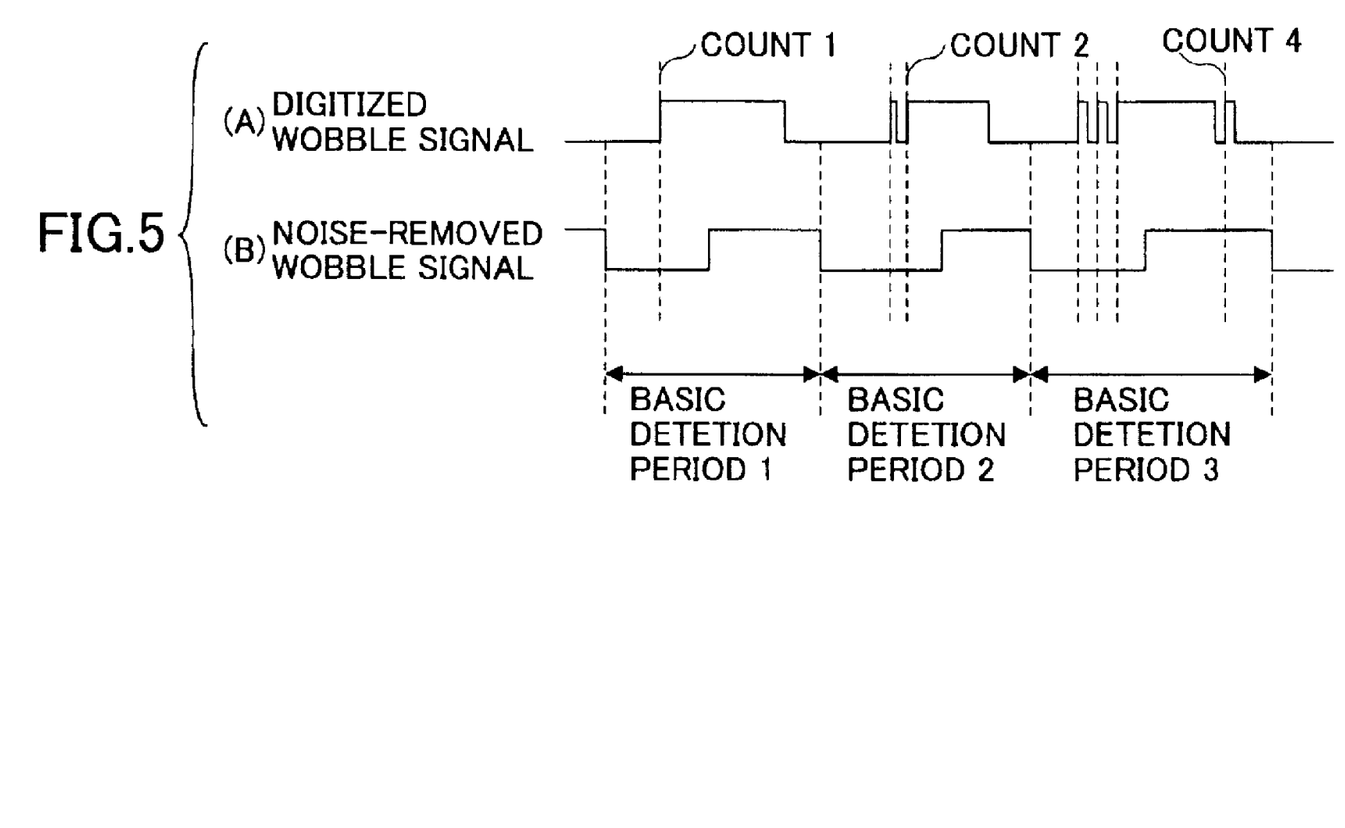
FIG. 5 is a diagram used for explaining a method for judging a quality of a wobble signal according to the present embodiment.

FIG. 5 is a diagram used for explaining a method for judging a quality of a wobble signal according to the present embodiment. FIG. 5 includes a case where the number of times edges of the wobble signal rise in one cycle is one (a basic detection period 1), a case where the number of the times is two (a basic detection period 2), and a case where the number of the times is four (a basic detection period 3).

In the present embodiment, the counter 90 outputs the number of times edges of the wobble signal in the form of pulses digitized by the pulse signal generation circuit 60 rise in one cycle. This output is supplied to the CPU 50. The CPU 50 judges the quality of the wobble signal according to the number of the times the edges of the wobble signal rise in one cycle. Specifically, when the supplied number of the times is one, it is judged that the wobble signal is not deteriorated and the quality thereof is not aggravated. When the number of the times is more than one, i.e., a plurality of times, it is judged that noises are superimposed on the wobble signal and the quality thereof is aggravated. As the number of the times becomes larger, it is judged that noises superimposed on the wobble signal are greater and the quality thereof is more aggravated. Besides, the CPU 50 forms a quality judgment unit.

Besides, it may be arranged that the CPU 50 detect the number of times edges of the wobble signal rise in a plurality of cycles, and judge the quality of the wobble signal according to the number of the times. That is, it may be arranged that a period including n basic detection periods (n representing a natural number), each of which is one cycle of the wobble signal, is predetermined as a detection period (=[basic detection period]* 3) for detecting the number of times edges of the wobble signal rise, and that the CPU 50 judges the quality of the wobble signal according to the number of the times the edges of the wobble signal rise in the detection period. Also in this case, when the number of the times exceeds a predetermined value, it can be judged that the quality of the wobble signal is aggravated; and as the number of the times becomes larger, it can be judged that the quality of the wobble signal is more aggravated.

Besides, it may be arranged that the CPU 50 detect the number of times edges of the wobble signal rise in each of the basic detection periods included in the detection period, and judge the quality of the wobble signal according to a maximum number of times among the detected number of the times. In addition, it may be arranged that a tolerance range is provided for the number of times edges of the wobble signal rise in each of the basic detection periods and that the CPU 50 judges the quality of the wobble signal is not aggravated when the number of the times is within three, for example, and judges that a quality abnormality occurs in the wobble signal when the number of the times exceeds three.

Thus, according to the present embodiment, the number of times edges of the wobble signal in the form of pulses generated by the pulse signal generation circuit 60 rise, which number corresponds to the quality of the wobble signal, can be output from the counter 90, and the quality of the wobble signal can be judged finely by degrees according to the number of the times.

Figure 6:
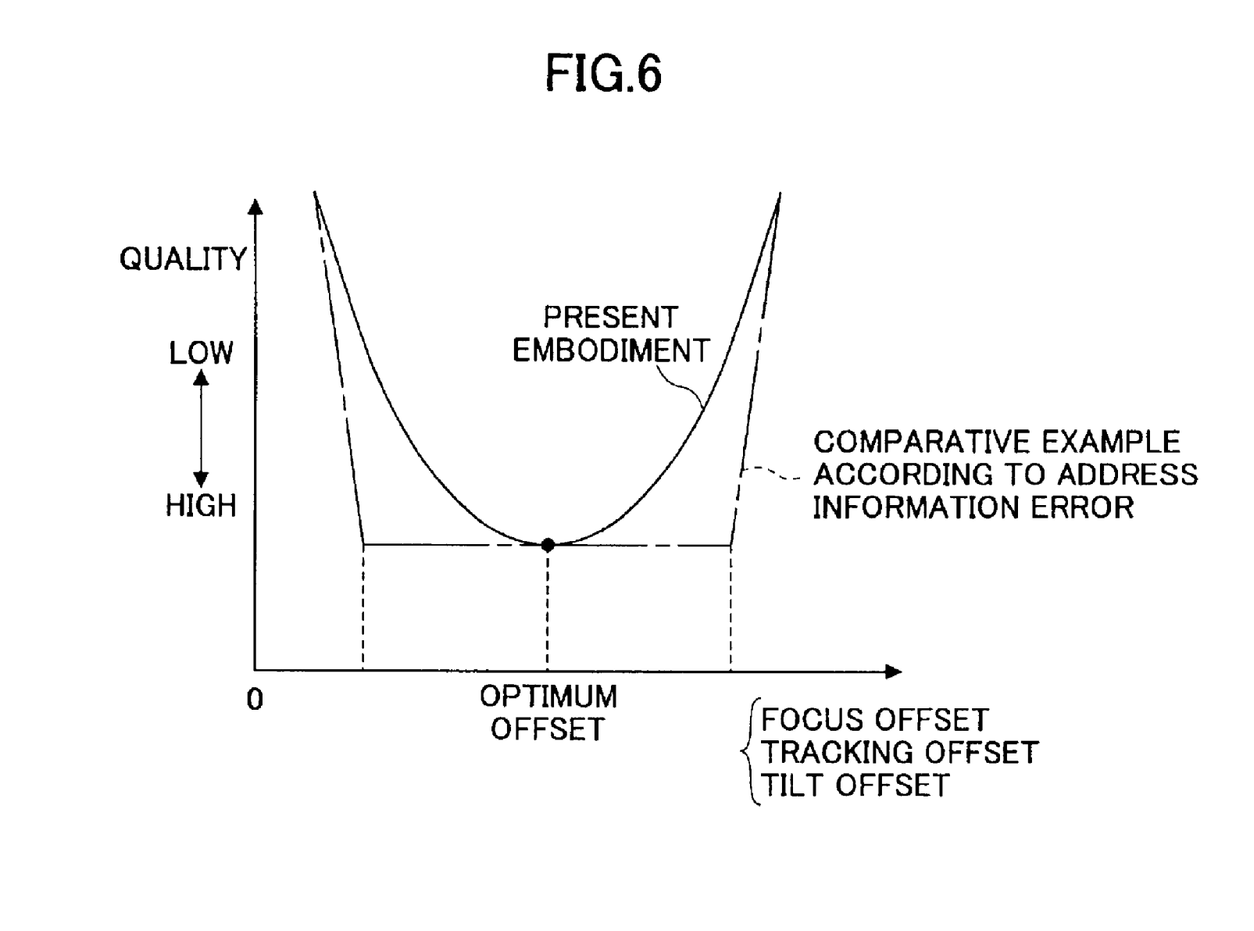
FIG. 6 is a graph comparing a case where a quality of a wobble signal is judged by using the method according to the present embodiment with a case where a quality of a wobble signal is judged by using a method according to a comparative example.

FIG. 6 is a graph comparing the following case 1 and case 2: in the case 1, a quality of a wobble signal is judged by using the method according to the present embodiment; in the case 2, a quality of a wobble signal is judged by using a method of judging according to whether or not there occurs a detection error of address information which should be extracted according to the wobble signal (hereinafter the method used in the case 2 is referred to as comparative example). In FIG. 6, the case 1 according to the present embodiment is represented by a solid line, and the case 2 according to the comparative example is represented by a dashed line, in which the axis of abscissas indicates a focus offset, a tracking offset or a tilt offset of the optical system 24, and the axis of ordinates indicates the quality of the wobble signal to be judged.

As represented by the dashed line in FIG. 6, the detection error of the address information which should be extracted according to the wobble signal does not occur unless the focus offset, the tracking offset and the tilt offset become considerably different from an optimum offset. In other words, when these offsets approximate the optimum offset, the detection error of the address information does not occur. Thus, according to the method of the comparative example of judging the quality of the wobble signal according to the presence of the detection error of the address information, it is impossible to judge the quality of the wobble signal finely and precisely.

By contrast, in the present embodiment, the quality of the wobble signal is judged regardless of the presence of the detection error of the address information which should be extracted according to the wobble signal. As represented by the solid line in FIG. 6, as the focus offset, the tracking offset and the tilt offset differ from the optimum offset, the quality of the wobble signal becomes aggravated accordingly. Thus, according to the method of the present embodiment, the quality of the wobble signal can be judged before the detection error of the address information occurs, and the quality of the wobble signal can be judged finely and precisely.

Besides, in the present embodiment, it may be arranged that the CPU 50 drives the alarm speaker 52 and the warning lamp 54 when the number of times edges of the wobble signal in the form of pulses digitized by the pulse signal generation circuit 60 rise in one cycle exceeds a predetermined number of times (e.g., three). According to this arrangement, a user can be informed that an abnormality occurs in the wobble signal generated in the optical disk device 10.

Additionally, it may be arranged that, when the number of times edges of the wobble signal in the form of pulses digitized by the pulse signal generation circuit 60 rise in one cycle exceeds a predetermined number of times (e.g., two), the CPU 50 performs various controls so that the focus offset, the tracking offset or the tilt offset approximates the optimum offset. According to this arrangement, the quality of the wobble signal can be optimized.

Besides, in the above-described embodiment, the number of times edges of the wobble signal converted into the pulse signal rise in one cycle is counted; however, it can be arranged that the number of times edges of the wobble signal fall be counted.

The present invention is not limited to the specifically disclosed embodiments, and variations and modifications may be made without departing from the scope of the present invention.

The present application is based on Japanese priority application No. 2001-270995 filed on Sep. 6, 2001, the entire contents of which are hereby incorporated by reference.

What is claimed is:

1. A signal processing circuit outputting a signal corresponding to a quality of a digitized input signal, the circuit comprising:

a noise-removed signal generation unit generating a noise-removed signal from said input signal, the noise-removed signal excluding a noise component, an edge counter counting a number of times said input signal rises and/or falls in a predetermined period that is defined by increments of one clock cycle of said noise-removed signal with reference to points in time at which a polarity of said noise-removed signal is inverted;

an output unit outputting a signal corresponding to said number of times as the signal corresponding to the quality of said input signal; and a quality judgment unit judging the quality of said input signal according to the signal output from said output unit.

2. The signal processing circuit as claimed in claim 1, wherein said predetermined period is between two points in time at which a polarity of said noise-removed signal is inverted.

3. The signal processing circuit as claimed in claim 2, wherein said noise-removed signal generation unit comprises a cumulative time counting unit counting a cumulative time in which said input signal is atone of a high-level state and a low-level state; and a retention unit performing one of a setting and a resetting of a high-level state according to said cumulative time, and clearing said cumulative time according to said state, wherein said edge counter counts the number of times said input signal rises and/or falls in a period after said retention unit performs one of the setting and the resetting of the high-level state until next time said retention unit performs one of the setting and the resetting of the high-level state.

4. The signal processing circuit as claimed in claim 3, wherein said cumulative time counting unit comprises a gate unit outputting a predetermined clock according to said input signal; and a counting unit counting said predetermined clock, wherein said retention unit performs one of the setting and the resetting of the high-level state according to a count value of said counting unit, and clears said count value of said counting unit according to said state.

5. The signal processing circuit as claimed in claim 4, wherein said gate unit comprises a first gate unit outputting the predetermined clock during a period in which said input signal is at the high-level state; and a second gate unit outputting the predetermined clock during a period in which said input signal is at the low-level state, and said counting unit comprises a first counting unit counting said predetermined clock output from said first gate unit; and a second counting unit counting said predetermined clock output from said second gate unit, wherein said retention unit performs the setting of the high-level state and clears a count value of said second counting unit when a count value of said first counting unit reaches a first count value, and performs the resetting of the high-level state and clears the count value of said first counting unit when the count value of said second counting unit reaches a second count value.

6. The signal processing circuit as claimed in claim 4, further comprising a latch circuit latching a count value of said edge counter when the count value of said counting unit reaches a predetermined value; and a delay circuit delaying an output of said counting unit by a predetermined time, wherein said edge counter is cleared according to an output of said delay circuit.

7. The signal processing circuit as claimed in claim 2, wherein said quality judgment unit judges that the quality of said input signal is aggravated when said number of times represented by said signal output by said output unit exceeds a predetermined number of times.

8. The signal processing circuit as claimed in claim 2, said quality judgment unit judges that the quality of said input signal is more aggravated as said number of times represented by said signal output by said output unit becomes larger.

9. The signal processing circuit as claimed in claim 2, further comprising a warning unit performing a predetermined warning to the effect that an abnormality occurs in said input signal when said number of times represented by said signal output by said output unit exceeds a predetermined number of times.

10. The signal processing circuit as claimed in claim 1, wherein said quality judgment unit judges that the quality of said input signal is aggravated when said number of times represented by said signal output by said output unit exceeds a predetermined number of times.

11. The signal processing circuit as claimed in claim 1, wherein said quality judgment unit judges that the quality of said input signal is more aggravated as said number of times represented by said signal output by said output unit becomes larger.

12. The signal processing circuit as claimed in claim 1, further comprising a warning unit performing a predetermined warning to the effect that an abnormality occurs in said input signal when said number of times represented by said signal output by said output unit exceeds a predetermined number of times.

* * * * *